Patented Nov. 19, 1946

2,411,413

UNITED STATES PATENT OFFICE 2,411,413

RESINOUS VULCANIZATION ACCELERATORS

Elmer W. Cook, New York, N. Y., and Edwin O. Hook, Norwalk, Conn., assignors to American Cyanamid Company, New York, N. Y., a corporation of Maine No Drawing. Application March 23, 1944, Serial No. 527,827

8 Claims. (Cl. 260—70)

This invention relates to accelerators for the vulcanization of sulfur-vulcanizable rubber and rubber-like materials. More particularly, the invention is concerned with vulcanization accelerators comprising reaction products of zinc chloride, formaldehyde, mercaptobenzothiazole and a monoarylguanidine.

The following examples, in which parts are given by weight, are illustrative of suitable methods of producing these vulcanization accelerators.

Product A

To a solution of 7 parts (1 mol) of zinc chloride in 10 parts water, 16.5 parts (1 mol) of monophenylguanidine carbonate was added and the mixture heated to 105° C. for 15 minutes to drive off carbon dioxide and water. A mixture of 50 parts (6 mols) of mercaptobenzothiazole and 9 parts (2 mols) of paraformaldehyde ( $(CH_2O)_3$ ) was added gradually to the melt which was maintained at 130-135° C. for about 35 minutes. On cooling, a hard, brittle, amber-colored resin was obtained which was readily ground to a fine powder.

Similarly, other accelerators may be prepared by varying the proportions. Typical compounds are those prepared by reacting mixtures containing the reactants in the following molar proportions, phenylguanidine carbonate: zinc chloride: formaldehyde: mercaptobenzothiazole=1:1:2:2, and 1:1:8:8.

Product B

Starting with a mixture of 7.5 parts hydroxyphenylguanidine (2 mols), 3.4 parts zinc chloride (1 mol), 415 parts paraformaldehyde (2 mols), and 25 parts mercaptobenzothiazole (6 mols), the procedure described for Product A was repeated to give a resinous material somewhat similar to Product A.

The utility of these materials as vulcanization accelerators is more particularly illustrated by the following tests utilizing a butadiene-styrene copolymer as indicative. The compositions were compounded in the usual manner on rubber rolls. Each of the compounds was made up from the same rubber stock with the only variable being the accelerator used. Mercaptobenzothiazole was used as the standard for comparison.

| | Compounds | | |
|---|---|---|---|
| | 1 | 2 | 3 |
| Buna-S | 100 | 100 | 100 |
| Carbon black | 50 | 50 | 50 |
| Coal tar softener | 5 | 5 | 5 |
| Zinc oxide | 5 | 5 | 5 |
| Sulfur | 2 | 2 | 2 |
| Mercaptobenzothiazole | 1.5 | | |
| Product A | | 1.1 | |
| Product B | | | 1.1 |
| Set-up tests—Williams 8 min. "Y" at 100° inches | | | |
| No heat | .157 | .158 | .164 |
| After 1.5 hours in boiling water | .217 | .186 | .195 |
| Change, percent | +38.2 | +17.7 | +18.9 |
| Shore hardness | | | |
| Cure at 141° C.: | | | |
| 30 minutes | 52 | 49 | 44 |
| 60 minutes | 58 | 57 | 52 |
| 90 minutes | 59 | 59 | 55 |
| Tensile tests | | | |
| 30′ cure at 141° C.: | | | |
| Modulus at 200%[1] | 380 | 260 | 165 |
| Modulus at 300%[1] | 780 | 500 | 250 |
| Tensile [1] | 2,620 | 1,935 | 900 |
| Elongation, percent [2] | 655 | 730 | 680 |
| 60′ cure at 141° C.: | | | |
| Modulus at 200%[1] | 645 | 535 | 350 |
| Modulus at 300%[1] | 1,270 | 1,065 | 735 |
| Tensile [1] | 2,665 | 2,660 | 2,125 |
| Elongation, percent [2] | 490 | 540 | 605 |
| 90′ cure at 141° C.: | | | |
| Modulus at 200% [1] | 760 | 665 | 520 |
| Modulus at 300% [1] | 1,510 | 1,290 | 1,070 |
| Tensile [1] | 2,950 | 2,665 | 2,215 |
| Elongation, percent [2] | 470 | 480 | 490 |

[1] Lb./sq. in.
[2] Elongation at break.

In the set-up tests, the highest percentage change on heating for 2.5 hours in boiling water indicates the greatest set-up and tendency to scorch or precure. The products of the present invention show more delayed accelerator action than mercaptobenzothiazole but, at full cure, give harder cured stocks than the latter material, indicating that our products are stronger accelerators.

As will be seen from the above tests the compounds of the present invention have strong accelerator action. These accelerators do not bring about undue precure and give hard cured stocks. Similar results are obtained with natural rubber and the various synthetic rubber-like materials which may be vulcanized in the presence of sulfur. The proportion of accelerator used may be varied widely although, for most purposes, the least amount of accelerator is utilized which will give the desired results. Of course, mixtures of the rubber-like materials with each other or with natural rubber may be vulcanized with the accelerators of the present invention. The vulcanized compositions using these accelerators give somewhat lower rates of cut-growth than mercaptobenzothiazole and this property is very valuable, especially in synthetic rubber compositions.

The present invention is not restricted to the specific processes given for the production of the accelerators since the methods of manufacture may be varied considerably to obtain substantially the same results. In place of the monophenylguanidine specifically set forth, mono-orthotolyl-, p-tolyl, xylyl. naphthyl, alkyl-oxyphenyl guanidines and similar mono-arylguanidines may be used.

We claim:

1. The method of preparing a condensation product which comprises reacting 1 mol of zinc chloride in aqueous solution with 1 mol of monophenylguanidine carbonate at a temperature of approximately 105° C., eliminating water and carbon dioxide therefrom and condensing the reaction product with a mixture of 6 mols of mercaptobenzothiazole and 2 mols of paraformaldehyde at a temperature of 130–135° C.

2. As a vulcanization accelerator, the resinous product obtained by fusing 2–8 mols of a paraformaldehyde and 2–8 mols of mercaptobenzothiazole with one mol of the reaction product of 1–2 mols of zinc chloride and one mol of a guanidine having the formula

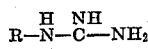

in which R is an aryl radical.

3. As a vulcanization accelerator the resinous product obtained by fusing 2 mols of a paraformaldehyde and 6 mols of mercaptobenzothiazole with one mol of the reaction product of 1–2 mols of zinc chloride and one mol of a guanidine having the formula

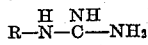

in which R is an aryl radical.

4. A vulcanization accelerator according to claim 3 in which the guanidine is monophenylguanidine.

5. A vulcanization accelerator according to claim 3 in which the guanidine is mono-o-tolylguanidine.

6. A vulcanization accelerator according to claim 3 in which the guanidine is mono-p-tolylguanidine.

7. The method of producing a vulcanization accelerator which comprises fusing a dried reaction product of 1–2 mols of zinc-chloride and 1 mol of a guanidine having the formula

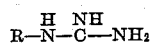

in which R is an aryl radical, with 2 mols of para-formaldehyde and 2–8 mols of a mercaptobenzothiazole.

8. The method of producing a vulcanization accelerator which comprises fusing a dried reaction product of 1–2 mols of zinc-chloride and 1 mol of a guanidine having the formula

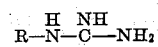

in which R is an aryl radical, with 2 mols of paraformaldehyde and 6 mols of mercaptobenzothiazole.

ELMER W. COOK.
EDWIN O. HOOK.